United States Patent [19]

Straehle et al.

[11] Patent Number: 4,481,309

[45] Date of Patent: Nov. 6, 1984

[54] PROCESS FOR THE PREPARATION OF CELLULAR AND NON-CELLULAR POLYURETHANES

[75] Inventors: Wolfgang Straehle, Heidelberg; Ingolf Buethe, Boehl-Iggelheim; Matthias Marx, Bad Durkheim, all of Fed. Rep. of Germany

[73] Assignee: BASF Aktiengesellschaft, Ludwigshafen, Fed. Rep. of Germany

[21] Appl. No.: 598,246

[22] Filed: Apr. 9, 1984

[51] Int. Cl.$^3$ .............................................. C08G 18/14
[52] U.S. Cl. ................................... 521/172; 521/173; 528/76; 528/77; 528/79
[58] Field of Search .................. 521/172, 173; 528/77, 528/76, 79

[56] References Cited

U.S. PATENT DOCUMENTS 3,455,886  7/1969  Versnel ............................... 521/171
3,585,185  6/1971  Levis et al. ......................... 521/171
3,639,541  2/1972  Austin et al. ....................... 521/169
3,639,542  2/1972  Pizzini et al. ...................... 521/169

*Primary Examiner*—Maurice J. Welsh
*Attorney, Agent, or Firm*—William G. Conger; Joseph D. Michaels

[57] ABSTRACT

The invention relates to a process for the preparation of cellular or non-cellular polyurethanes through the reaction of organic polyisocyanates with a polyether-polyester polyol component containing di- to tetrafunctional polyether-polyester polyols having hydroxyl numbers of from 10 to 200, which are themselves prepared by esterifying conventional di- to tetrafunctional polyether polyols with carboxylic acid anhydrides, preferably aromatic carboxylic acid anhydrides, in the presence of selected catalysts to form carboxylic acid half esters, and oxyalkylating the resulting carboxylic acid half esters with alkylene oxides in the presence of N-methylimidazole, triethylene diamine, triphenylphosphine or mixtures thereof with thiodialkylene glycol as catalysts.

12 Claims, No Drawings

PROCESS FOR THE PREPARATION OF CELLULAR AND NON-CELLULAR POLYURETHANES

BACKGROUND OF THE INVENTION

1. Field of the Invention

The subject invention relates to a process for the preparation of cellular and non-cellular polyurethanes having desirable physical properties. More particularly, the invention relates to the preparation of cellular and non-cellular polyurethanes wherein selected polyether-polyester polyols, prepared utilizing specific oxyalkylation catalysts, are utilized as the polyol component of the polyurethanes.

2. Description of the Prior Art

The preparation of cellular or non-cellular polyurethanes through the reaction of organic polyisocyanates with orgaic polyhydroxyl compounds (polyols) is well known. Particular attention is drawn, for example, to the monograph by J. H. Saunders and K. C. Frisch, *High Polymers*, Vol. XVI, "Polyurethanes," Pts. I and II (New York: Interscience Publishers, 1962, 1964) and by R. Vieweg and A. Hochtlen, Kunststoff-Handbuck, Vol. VII, *Polyurethane*, (Munich, Carl Hanser Verlag, 1966).

Ester group-containing polyether polyols are frequently used as the polyol component for the preparation of flame-resistant, semi-rigid, or rigid polyurethane foams. The preparation of these polyether-polyester polyols is illustrated by reference to U.S. Pat. Nos. 3,585,185, 3,639,541, and 3,639,542. For example, polyether polyols, which may contain phosphorus compounds as initiator molecules may be reacted with halogen-containing carboxylic acid anhydrides, in particular tetrabromo- or tetrachlorophthalic acid anhydride to form carboxylic acid half esters following which the free carboxylic acid groups are oxyalkylated.

According to European Patent Application 468, polyether polyol mixtures having a functionality of from 2.8 to 4.5 are reacted with tetrachlorophthalic acid anhydride in a hydroxyl-to-anhydride-group ratio of from 1:1 to 1.1:1 to form tetrachlorophthalic acid half esters and said half esters are then oxyalkylated with from 1 mole equivalent to 1.5 mole-equivalent of alkylene oxide. The resulting chlorine-containing polyether-polyester polyols are suitable for the preparation of rigid polyurethane or polyisocyanurate foams.

The oxyalkylation of reaction products prepared from carboxylic acid anhydrides and alcohols or amines in an equivalent ratio of from 0.1:1 to 2.0:1 with from 1.5 to 14 moles of alkylene oxide per mole equivalent of carboxylic acid anhydride is described in U.S. Pat. No. 3,445,886. These polyether-polyester polyols may also be utilized for the preparation of semi-rigid and rigid polyurethane foams.

The oxyalkylation described in the above references is generally performed in the presence of basic catalysts, for example, alkali hydroxides or alkali alcoholates, although occasionally acid catalysts is utilized. The disadvantage of these catalysts is that they not only accelerate the oxyalkylation of the carboxyl groups, they also catalyst polyoxyalkylation at the expense of complete initial esterification of the remaining acid functionality of the half esters. In order to assure that all the carboxy groups are completely esterified, the oxyalkylation must generally be performed with a large excess of alkylene oxide over a long reaction time. A further disadvantage is that the catalysts must be separated from the reaction mixture after completion of the reaction, which necessitates lengthy and expensive purification operations.

In order to avoid post-reaction purification, in European Application No. 468 and German Application No. 1 568 249, the oxyalkylation of the carboxylic acid half esters is performed in the absence of catalysts. However, a large excess of alkylene oxide is still necessary in the non-catalytic oxyalkylation in order to esterify all the carboxyl groups. A further disadvantage is that the non-reacted alkylene oxides, up to 15 weight percent of the amounts originally used, must be stripped. The stripping process, along with the need for proper disposal compromises the cost effectiveness and environmenal soundness of this process.

In order to eliminate this disadvantage, in German Pat. No. 3,201,203, the carboxylic acid half esters are oxyalkylated with one mole of alkylene oxide per mole-equivalent of carboxyl group, in the presence of a thiodialkylene glycol as a catalyst. In this process, particularly good results are obtained when glutaric acid anhydride is used to prepare the carboxylic acid half esters. However, if the polyols are reacted with other carboxylic acid anhydrides, such as tetrahydro- or phthalic acid anhydride, and the carboxylic acid half-esters are subsequently oxyalkylated, the resulting polyester or polyether-polyester polyols are difficult to process into polyurethanes in a reproducible manner. The process of the subject invention eliminates such defects by utilizing a process for the preparation of polyester or polyether-polyester polyols wherein the carboxylic acid half-esters are oxyalkylated in the presence of specific oxyalkylation catalysts.

SUMMARY OF THE INVENTION

The object of the subject invention is to improve the mechanical properties of cellular and non-cellular polyurethanes, by increasing the compression hardness without negatively affecting properties such as tensile strength and elongation, which generally behave in an opposite manner.

This problem was unexpectedly solved through the use of polyether-polyester polyols prepared through special methods as the polyol component of the polyurethane. These polyether-polyester polyols are prepared by reacting conventional polyether polyols with carboxylic acid anhydrides, preferably aromatic carboxylic acid anhydrides, following which the resulting terminal carboxyl groups of the resultant half esters are oxyalkylated. The selection of specific catalysts according to the process of this invention allows complete oxyalkylation of the half esters with the lowest possible amounts of alkylene oxide.

DESCRIPTION OF THE PREFERRED EMBODIMENTS

The subject of the invention is a process for the preparation of cellular or non-cellular polyurethanes through the reaction of an organic polyisocyanate with a polyol component in the presence of suitable catalysts and, in some cases, chain extenders or cross-linking agents, blowing agents, and auxiliaries or additives; wherein the improvement comprises utilizing as said polyol component an isocyanate-reactive polyol containing from 30 percent to 100 percent by weight of di- to tetrafunctional polyether-polyester polyols having hydroxyl numbers from 10 to 200 prepared by the process of:
(a) esterifying di- to tetrafunctional polyether polyols having hydroxyl numbers from 15 to 250 with carboxylic acid anhydrides to form carboxylic acid half esters, and
(b) oxyalkylating the carboxylic acid half esters with alkylene oxides in the presence of a catalyst selected from the group consisting of:
(i) N-methylimidazole,
(ii) triethylenediamine,
(iii) triphenylphosphine,
(iv) mixtures of two or more of (i), (ii) and (iii), and
(v) a mixture of thiodialkylene glycol and at least one of (i), (ii), and (iii).

Polyisocyanates suitable for the preparation of said cellular or non-cellular polyurethanes of the subject invention are, for example, aliphatic, cycloaliphatic, arylaliphatic and preferably, aromatic polyisocyanates. Typical examples are: aliphatic diisocyanates such as ethylene diisocyanate, 1,4-tetramethylene diisocyanate, 1,6-hexamethylene diisocyanate, and 1,12-dodecane diisocyanate; cycloaliphatic diisocyanates such as 1,3-cyclohexane diisocyanate and 1,4-cyclohexane diisocyanate as well as various mixtures of these isomers, 1-isocyanato-3,3,5-trimethyl-5-(isocyanatomethyl)cyclohexane, 2,4- and 2,6-methylcyclohexane diisocyanate as well as various mixtures of these isomers, 4,4'-and 2,4'-diisocyanatodicyclohexylmethane; aromatic diisocyanates such as 1,3- and 1,4-phenylene diisocyanate, 2,4- and 2,6-toluene diisocyanate as well as various mixtures of these isomers, 2,2'-, 2,4'-and 4,4'-diphenylmethane diisocyanate, and 1,5-naphthalene diisocyanate; aromatic polyisocyanates such as 4,4',4"-triphenylmethane triisocyanate, 2,4,6-triisocyanatobenzene, and polyphenylene polymethylene polyisocyanates, Modified polyisocyanates can also be used, for example, those described in U.S. Pat. No. 3,492,330, carbodiimide-group-containing polyisocyanates (German Patent No. 10 92 007), allophanate-group-containing polyisocyanates (British Pat. No. 994 890; Belgium Pat. No. 761 626), isocyanurate-group-containing polyisocyanates (German Pat. Nos. 10 22 789, 12 22 067, 10 27 394, 19 29 034, and 10 04 048), urethane-group-containing polyisocyanates, (Belgium Pat. No. 752 261, U.S. Pat. No. 3,394,164) biuret-group-containing polyisocyanates, (German Pat. No. 11 01 394, British Pat. No. 889 050), and ester-group-containing polyisocyanates (British Pat. Nos. 965 474 and 10 72 956, U.S. Pat. No. 3,567,763, and German Pat. No. 12 31 688).

Preferably used are commercially available, aromatic di- and polyisocyanates, which may contain urethane groups, such as 2,4-and 2,6-toluene diisocyanate and mixtures thereof, 2,2'-, 2,4'-, and 4,4'-diphenylmethane diisocyanate and mixtures thereof, mixtures of 2,2'-, 2,4'-, and 4,4'-diphenylmethane diisocyanates with polyphenylene polymethylene polyisocyanates (polymeric MDI), and mixtures of toluene diisocyanates and polymeric MDI. These di- and polyisocyanates can be used individually or in mixtures.

Essential to the subject invention is the inclusion of di- to tetrafunctional, preferably 2.5- to trifunctional polyether-polyester polyols having hydroxyl numbers from 10 to 200, preferably from 25 to 56, in the organic polyether-polyester polyol component prepared by the process of esterifying conventional polyether polyols having functionalities of from 2 to 4, preferably from 2.5 to 3, and hydroxyl numbers from 15 to 250, preferably from 30 to 110, with carboxylic di- and/or monoanhydrides, preferably aromatic carboxylic acid monoanhydrides, preferably in the presence of esterification catalysts, to form carboxylic acid half esters, followed by oxyalkylating the carboxylic acid half esters thus formed with alkylene oxides in the presence of N-methylimidazole, triethylenediamine, triphenylphosphine, mixtures thereof, or mixtures of one or more thereof with thiodialkylene glycol, as oxyalkylation catalysts. Mixtures of N-methylimidazole and/or triethylene diamine and triphenylphosphine are preferably used.

The conventional polyether polyols suitable for use in the process of the invention having a functionality of from 2 to 4 and a hydroxyl number of from 15 to 250 may be prepared in accordance with known methods, for example, by polyoxyalkylating an initiator molecule containing from 2 to 4, preferably from 2.5 to 3 active hydrogen atoms, with one or more alkylene oxides or cyclic ethers having from 2 to 4 carbon atoms in the alkylene radical, in the presence of acid, or preferably, basic cataysts such as alkali hydroxides or alkali alcoholates; or through the polymerization of tetrahydrofuran with suitable catalysts, for example, boron trifluoride etherate, antimony pentachloride, or fuller's earth.

Suitable alkylene oxides and cyclic ethers are, for example: oxetane, 1,2-, 2,3-butylene oxide, styrene oxide, and preferably, ethylene oxide and propylene oxide. The alkylene oxides may be reacted singly, as mixtures, or sequentially, to form homopolymeric, heteropolymeric, or block-polymeric alkylene oxide addition products.

Typical initiator molecules which may be used are: water; organic dicarboxylic acids such as succinic acid, adipic acid, phthalic acid, and terephthalic acid; aliphatic and aromatic diamines, in some cases N-mono-, N,N-, and N,N'-dialkyl-substituted diamines having from 1 to 4 carbon atoms in the alkyl radical, for example, mono- and dialkyl-substituted ethylene diamine, diethylene triamine, triethylene tetramine, 1,3-propylene diamine, 1,3- and 1,4-butane diamine, 1,2-, 1,3-, 1,4-, 1,5-, and 1,6-hexamethylene diamine, phenylene diamine, 2,4-, and 2,6-toluene diamine and 4,4'-, 2,4'-, and 2,2'-diaminodiphenylmethane; monoamines such as methylamine, ethylamine, isopropylamine, butylamine, benzylamine, aniline, toluidines, and naphthylamines. Especially useful compounds are: N,N,N', N'-tetrakis(2-hydroxyethyl)ethylenediamine, N,N,N',N'-tetrakis(2-hydroxypropyl)ethylenediamine, N,N,N',N",N"-pentakis(2-hydroxyethyl)ethylenetriamine, phenyl diisopropanolamine, and higher molecular weight alkylene oxide adducts of aniline.

Additional initiator molecules are: alkanolamines such as ethanolamine, diethanolamine, N-methyl- and N-ethyl-diethanolamine, N-methyl- and N-ethyl-dipropanolamine, triethanolamine; hydrazine and hydrazides; di- to tetra-functional, preferably di- to trifunctional alcohols, for example, ethylene glycol, 1,2- and 1,3-propylene glycol, diethylene glycol, dipropylene glycol, 1,4-butylene glycol, 1,6-hexamethylene glycol, glycerine, trimethylolpropane, and pentaerythritol.

The polyether polyols can be utilized individually or in the form of mixtures. Preferably, polyether polyols are used which contain not more than 30 weight percent, preferably not more than 5 to 10 weight percent ethylene oxide residues based on the total weight of alkylene oxide residues, said polyether polyols having hydroxyl numbers from 15 to 250. Particularly well suited are polyoxypropylene ether glycols and/or triols having hydroxyl numbers from 30 to 110.

Aliphatic, optionally halogenated monoanhydrides; cycloaliphatic, optionally substituted di- and/or monoanhydrides; and aromatic, optionally substituted di- and/or mono-anhydrides; are utilized as the carboxylic acid anhydrides. Particularly well suited are aromatic, optionally substituted monoanhydrides. Typical carboxylic acid anhydrides are: aliphatic carboxylic acid anhydrides such as maleic acid anhydride, dichloromaleic acid anhydride, succinic acid anhydride, and glutaric acid anhydride; cycloaliphatic carboxylic acid anhydrides such as, for example, hexahydro- and tetrahydrophthalic acid anhydride; and preferably, aromatic carboxylic acid anhydrides such as tetrachlorophthalic acid anhydride, tetrabromophthalic acid anhydride, trimellitic acid anhydride, pyromellitic acid dianhydride, and phthalic acid anhydride. Phthalic acid anhydride is particularly well suited.

In order to prepare the carboxylic acid half esters, the conventional polyether polyols or polyether polyol mixtures and the carboxylic acid anhydride or carboxylic acid anhydride mixtures are esterified at temperatures from 50° to 240° C., preferably from 90° to 200° C., for a period of from 0.5 to 8 hours, preferably from 1 to 4 hours. The esterification takes place preferably in the presence of catayts. From 0.25 to 1.05 mole-equivalents, and preferably from 0.95 to 1.0 mole-equivalents, carboxylic acid anhydride are present in the reaction mixture per mole-equivalent polyether polyol. Triphenylphosphine, N-methylimidazole, triethylene diamine or mixtures thereof have proven to be effective esterification catalysts. Preferably used are N-methylimidazole and triethylenediamine. The catalysts are used in amounts from 0.05 to 2.0 parts by weight, preferably from 0.1 to 0.4 parts by weight, per 100 parts by weight of the conventional polyether polyol/anhydride reaction mixture.

These same esterification catalysts have been found to be most effective in the oxyalkylation reaction. Thus, the previously formed half-esters may be oxyalkylated directly, without removing the esterification catalyst. It may be preferable to add additional amounts of the same catalyst as used for the esterification reaction, or to add one or more additional catalysts. A thiodialkylene glycol such as thiodiethylene glycol may be used in conjunction with one of the aforementioned catalysts for the oxyalkylation if desired.

The oxyalkylation takes place in the presence of from 0.05 to 2.0 parts by weight, preferably from 0.1 to 0.4 parts by weight of the oxyalkylation catalysts, based on 100 parts by weight of the carboxylic acid half ester. From 1 to 4 mole-equivalents, preferably one mole-equivalent, of propylene oxide, mixtures of propylene oxide and ethylene oxide, or preferably, ethylene oxide alone, is added per mole-equivalent of carboxyl group. Triphenylphosphine is preferred as the oxyalkylation catalyst.

Particularly advantageous results are obtained when the carboxylic acid half ester is prepared in the presence of N-methylimidazole and triethylenediamine, or mixtures thereof as catalysts and additional triphenylphosphine is added to the reaction mixture for the oxyalkylation. This represents a preferred embodiment.

Thiodialkylene glycols suitable for the oxyalkylation catalysts possess from 2 to 6, preferably 2 to 3, carbon atoms in the alkylene radical. Typical examples are thiodihexylene glycol, thiodibutylene glycol, and, preferably, thiodipropylene and/or thiodiethylene glycol.

The oxyalkylation of the carboxylic half ester is generally performed at temperatures from 80° to 160° C., preferably from 90° to 130° C., at standard pressure or, preferably, at elevated pressure. Especially useful, for example, are pressures from 0.5 to 10 bar, advantageously in the presence of gases which are inert under the reaction conditions, for example, nitrogen, helium, neon, etc., or mixtures thereof.

After an acid number of less than 1 has been reached, the oxyalkylation is stopped. If the reaction mixture still contains free monomeric alkylene oxide, the mixture is stripped at reduced pressure. It is not necessary to remove the catalysts used for the preparation of the carboxylic acid half ester and for the oxyalkylation of the resulting polyether-polyester polyols.

In order to prepare the cellular or non-cellular polyurethanes in accordance with the process of the invention, the polyether-polyester polyols can be utilized individually or as mixtures. Mixtures of the polyether-polyester polyols and other polyols having a functionality of from 2 to 4, preferably from 2.5 to 3, and hydroxyl numbers from 10 to 200, preferably from 30 to 110, can be used in accordance with the subject invention. Such polyols may be, for example, hydroxyl-group-containing polyesters, polyester amides, polyacetals, polycarbonates, and, preferably, graft polymer polyether polyols, polyether polyol filler dispersions, and conventional polyether polyols, provided said mixtures contain at least 30 weight percent, preferably from 50 to ca. 100 weight percent polyether-polyester polyols prepared by the process of the invention based on the total weight of the polyol component.

In some cases, it may be desirable to utilize, in addition to the polyether-polyester polyol component, additives such as chain extenders or cross-linking agents, to introduce rigid segments into the resulting polyurethanes. Such additives are polyfunctional, particularly di- and trifunctional compounds having molecular weights from 17 to 600, preferably from 60 to 300. Suitable, for example, are: di- and trialkanolamines such as diethanolamine and triethanolamine, aliphatic and aromatic diamines such as ethylenediamine, 1,4-butylenediamine, 1,6-hexamethylenediamine, 4,4'-diaminodiphenylmethane, 3,3'-dialkyl-substituted-4,4'-diaminodiphenylmethanes, 3,3',5,5'-tetraalkyl-substituted-4,4'-diaminodiphenylmethanes, 2,4- and 2,6-toluenediamine, and preferably, aliphatic diols and triols having from 2 to 6 carbon atoms, such as ethylene glycol, 1,4-butylene glycol, 1,6-hexamethylene glycol, glycerine, and trimethylol propane.

When chain extenders or cross-linking agents are used, they are generally used in amounts from 1 to 10, preferably from 1 to 4 parts by weight per 100 parts by weight polyether-polyester polyol component.

Blowing agents or their precursors, sometimes termed "reactive" blowing agents, may be utilized. Where the unqualified term "blowing agent" is utilized in the subject invention, it is understood to include both inert as well as reactive blowing agents. Among the reactive blowing agents which can be utilized in the process of the invention for the preparation of cellular polyurethanes is water, which reacts with isocyanate groups to form carbon dioxide. The amounts of water used most successfully are from 0.5 to 20 parts by weight, preferably from 1.5 to 10 parts by weight, and more preferably from 2 to 6 parts by weight, based on 100 parts by weight of the polyether-polyester polyol component.

Inert blowing agents may also be used, either alone or mixed with water. Suitable liquids are those inert to the polyisocyanates and which possess boiling points less than 100° C., preferably less than 50° C., and most preferably between −50° C. and 30° C. at atmospheric pressure, and which vaporize under the effect of the exothermic addition polymerization reaction. Typical blowing agents are hydrocarbons such as pentane, n-butane, iso-butane, and propane; ethers such as dimethyl ether and diethyl ether; ketones such as acetone and methylethyl ketone; ethyl acetate; and preferably, halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low boiling point liquids may also be utilized.

The desired amount of inert blowing agent can be determined simply, based on the amount of water which is present and the desired foam density. In the absence of water, this amount is approximately 1 to 4 parts by weight, preferably 3 to 15 parts by weight, per 100 parts by weight polyether-polyester polyol component. It may be desirable to mix the organic polyisocyanate with the blowing agent to thereby lower the viscosity of the polyisocyanate component.

In order to accelerate the reaction between the polyether-polyester polyol component, water, chain extenders, or cross-linking agents, and the organic polyisocyanates, standard polyurethane catalysts may be incorporated into the reaction mixture. Basic polyurethane catalysts are preferably used, for example, tertiary amines such as dimethylbenzylamine, dicyclohexylmethylamine, dimethylcyclohexylamine, N,N,N',N'-tetramethyldiaminobutane, N,N,N',N'-tetramethyldiaminoethyl ether, bis(dimethylaminopropyl)urea, N-methyl- and N-ethylmorpholine, dimethylpiperazine, pyridine, 1,2-dimethylimidazole, 1-azabicyclo[3.3.0]octane, dimethylaminoethanol, 2-(dimethylaminoethoxy)ethanol, N,N',N''-tris(dialkylaminoalkyl)hexahydrotriazenes such as N,N',N''-tris(dimethylaminopropyl)-s-hexahydrotriazine and, in particular, triethylene diamine. However, metal salts such as iron(II)chloride, zinc chloride, lead octoate, and, preferably tin salts such as tin dioctoate, tin diethylhexanoate, and dibutyl tin dilaurate as well as mixtures of tertiary amines and organic tin salts are also suitable. It is desirable to use from 0.1 to 10 weight percent, preferably from 0.5 to 5 weight percent, catalysts based on tertiary amines and/or from 0.01 to 0.5 weight percent, preferably from 0.05 to 0.25 weight percent metal salts, based on the weight of the polyether-polyester polyol component.

Auxiliaries or additives can also be incorporated in the reaction mixture. Typical examples are surfactants, foam stabilizers, cell regulators, fillers, colorants, pigments, flame retardants, anti-hydrolytic agents, and fungistatic and bacteriostatic substances.

Surfactants which help to homogenize the various components and also regulate cell structure are especially useful. Typical surfactants are, for example, emulsifiers such as the sodium salts of castor oil sulfates or of fatty acids; salts of fatty acids with amines, for example, maleic acid diethylamine or stearic acid diethanolamine salts; salts of sulfonic acids such as alkali or ammonium salts of dodecylbenzene sulfonic acid or dinaphthylmethanedisulfonic acid and ricinoleic acid; foam stabilizers such as siloxaneoxyalkylene copolymers and other organic polysiloxanes, oxyethylated alkylphenols, oxyethylated fatty alcohols, paraffin oil, esters of cator oil, ricinoleic acid or Turkey red oil, and cell regulators such as paraffins, fatty alcohols, and dimethylpolysiloxanes. The surfactants are generally present in amounts from 0.01 to 5 parts by weight based on 100 parts by weight polyether-polyester polyol component.

By the term fillers, in particular fillers which have a reinforcing effect, is meant conventional organic and inorganic fillers, reinforcing agents, weight-increasing agents, and agents for improving wear in paints, coatings, et. Typical examples are: inorganic fillers such as silicate minerals, for example lamellar silicates such as antigorite, serpentine, horn blende, amphibolite, chrysotile, and talcum; metal oxides such as kaolin, aluminum oxides, titanium oxides, and iron oxides; metal salts such as chalk, and barium sulfate; and inorganic pigments such as cadmium sulfide, zinc sulfide, glass, ground asbestos, etc. Preferably, kaolin (China Clay), aluminum silicate, and coprecipitates of barium sulfate and aluminum silicate are used, as well as natural and synthetic fibrous minerals such as asbestos, wollastonite, and in particular, glass fibers of varying lengths, which may be treated with size. Typical organic fillers are: carbon black, melamine, pine resin, cyclopentadienyl resins, and, preferably styreneacrylonitrile-based graft polymers prepared through in situ polymerization of acrylonitrile-styrene mixtures in polyether polyols, similar to German Pat. Nos. 11 11 394, 12 22 669, (U.S. Pat. Nos. 3,304,273, 3,383,351, 3,523,093), 11 52 536, (British Pat. Nos. 1,040,452) and 11 52 537 (British Pat. No. 987,618) as well as filled polyether polyols in which aqueous polymer dispersions are transformed into polyether polyol dispersions.

The inorganic and organic fillers may be used individually or as mixtures. Preferred are stable polyether polyol dispersions in which the fillers are reduced in size in the presence of polyether polyols in situ with high localized energy gradients to a particle size less than 7 μm and are simultaneously dispersed by this action. Filled polyether polyol dispersions of this type are described, for example, in German Pat. Nos. 28 50 609, 28 50 610, and 29 32 304.

The inorganic and organic fillers are advantageously incorporated into the reaction mixture in amounts from 0.5 to 50 weight percent, preferably from 1 to 40 weight percent, based on the weight of the polyisocyanatepolyether-polyester polyol component reaction mixture.

Suitable flame retardants may also be added, such as, for example: tricresyl phosphate, tris-(2-chloroethyl)phosphate, tris-(chloropropyl)phosphate, and tris-(2,3-dibromopropyl)phosphate. Also used as flame retardants are inorganic flame retardants such as hydrated aluminum oxides, antimony trioxide, arsenic oxides, ammonium polyphosphate, and calcium sulfate as well as the esterification products of low-molecular-weight mono- and polyfunctional alcohols and halogenated phthalic acid derivatives. In general, it has been found to be desirable to use from 5 to 50 parts by weight, preferably from 5 to 25 parts by weight, of the above-cited flame retardants per 100 parts by weight polyether-polyester polyol component.

Further information on other conventional auxiliaries or additives may be found in the literature, in particular the monograph by J. H. Saunders and K. C. Frisch, "High Polymers," Vol. XVI, *Polyurethanes*, Pts. 1 1 and 2, Interscience Publishers: 1962/1964.

In order to prepare the polyurethanes in accordance with the process of the invention, the organic polyisocyanates and polyether-polyester polyvol component, chain extenders, and cross-linking agents are reacted in the presence of catalysts, and in some cases, blowing agents, auxiliaries and additives, at temperatures from 0° to 70° C., preferably from 15° to 50° C., at active hydrogen/isocyanate ratios of from 0.5 to 2:1, preferably from 0.8 to 1.6:1, and most preferably approximately 1:1.

The cellular or non-cellular polyurethanes can also be prepared using the prepolymer process. To do this, the polyether-polyester polyols are transformed using ordinary methods into isocyanate-group-containing prepolymers by the addition of polyisocyanates, preferably mixtures of 4,4'- and 2,4'-diphenylmethane diisocyanates or mixtures of diphenylmethane diisocyanates and polyphenylene polymethylene polyisocyanates having a diphenylmethane diisocyanate content in excess of 60 weight percent. The isocyanate-group-containing prepolymers can be reacted as such or in the form of a mixture with polyisocyanates, preferably a mixture of diphenylmethane diisocyanates and polyphenylene polymethylene polyisocyanates, with additional polyether-polyester polyol component or with conventional polyols, along with, in some cases, chain extenders or cross-linking agents in the presence of catalysts and, in some cases, blowing agents, auxiliaries, and additives.

Preferably, however, the cellular or non-cellular polyurethanes are prepared in a one-shot process. Here the initial components, auxiliaries, and additives are added individually using a mixing head with several feed nozzles and are mixed together intensively in a mixing chamber. It has been found to be particularly desirable to use a two-component process, and to combine the polyether-polyester polyol component, catalysts, and, in some cases, chain extenders, cross-linking agents, blowing agents, auxiliaries, and additives on the so-called A component side; and to use as the B component the polyisocyanate, modified polyisocyanate and/or the isocyanate-group-containing prepolymers, in some cases in admixture with blowing agents, and auxiliaries or additives. The advantage of the two-component process is that the A and B components need only to be intensively mixed together in the proper quantitative ratios to prepare the polyurethanes. The basic components can also be mixed together in a one-shot process with the aid of familiar reaction injection molding techniques (RIM), injected into molds, and cured in the closed molds to form polyurethanes.

The dense, elastic, non-cellular or microcellular polyurethanes prepared in accordance with the invention possess densities from 0.8 to 1.4 g/cm$^3$, preferably from 1.1 to 1.2 g/cm$^3$, and possess very good tensle strength, elongation, and tear strength. The products are suitable for the preparation of highly abrasion resistant polyurethane molded parts such as rolls, sliding shoes, sliding corners for snow removal equipment, etc.

Elastic, cellular polyurethanes prepared by this process may have densities of from 0.2 to 1.2 g/cm$^3$. Shoe soles preferably have a density from 0.3 to 0.7 g/cm$^3$, while RIM molded parts preferably have a density from 0.7 to 1.1 g/cm$^3$. Both exhibit very good compression hardness, tensile strength, and elongation. The highly elastic, flexible foams having densities from 0.02 to 0.2 g/cm$^3$ are suitable for the production of upholstery cushions, mattresses, automotive seat cushions, and neck supports, as well as particularly for molding foams. Elastic polyurethanes find uses as automotive exterior parts, impactabsorbing moldings, bumper coatings, and in corner protection applications.

The following materials were used to prepare the cellular or non-cellular polyurethanes in the examples. The parts cited in the examples refer to parts by weight.

Polyol I:
A gylcerine initiated polyoxypropylene polyoxyethylene block copolymer having a hydroxyl number of 35 and an ethylene oxide content of 15 weight percent.

Polyol II:
A glycerine initiated polyoxypropylene polyoxyethylene heteric copolymer having a hydroxyl number of 42 and an ethylene oxide content of 70 weight percent in a random distribution.

Polyol III:
A glycerine initiated polyoxypropylene polyoxyethylene heteric/block copolymer copolyether having a hydroxyl number of 56 and an ethylene oxide content of 11 weight percent, of which three-fifths are present in a random distribution and two-fifths as a terminal block.

Polyol IV:
Three thousand parts (1 mole) Polyol III were esterified with 444 parts of (3 moles) phthalic acid anhydride in the presence of 0.2 weight percent N-methylimidazole in a nitrogen atmosphere for 4 hours at 180° C. while being agitated.

The reaction mixture was allowed to cool to 105° C., following which 0.2 parts by weight thiodiethylene glycol was added, and an oxyethylation reaction was performed at 2 bar nitrogen pressure with 132 parts (3 moles) ethylene oxide. At the end of oxyethylation, the volatile components were stripped at 105° C. and 0.01 bar. The resulting polyether-polyester polyol had a hydroxyl number of 49 and could be used for the preparation of polyurethanes without further purification.

Polyol V:
A procedure similar to that used in the preparation of Polyol IV was used, however, the equivalent amount of tetrahydrophthalic acid anhydride was used in place of the phthalic acid anhydride and 0.2 weight percent triphenylphosphine was used instead of thiodiethylene glycol for the ethyoxylation. The resulting polyether-polyester polyol had a hydroxyl number of 51.

Polyol VI:
Thirty-two hundred parts (3 moles) of a polyoxypropylene glycol having a hydroxyl number of 105 were heated to 180° C. under a nitrogen atomsphere with 888 parts (6 moles) phthalic acid in the presence of 0.2 weight percent N-methylimidazole and agitated for four hours.

The reaction mixture was then allowed to cool to 105° C., following which 0.2 weight percent thiodiethylene glycol was added, and the mixture was oxypropylated at 0.5 bar nitrogen pressure with 348 parts (6 moles) propylene oxide. After completion of the oxypropylation, the volatile components were stripped at 105° C. and 0.01 bar. The resulting polyether-polyester polyol possessed a hydroxyl number of 81 and could be used for the preparation of polyurethane without additional purification.

Isocyanate A:
An isocyanate-group-containing prepolymer with an isoocyanate content of 23 weight percent, prepared by the reaction of 100 parts of a mixture comprising 4,4'- and 2,4'-diphenylmethane diisocyanate in a weight ratio of 75:25 and 39.5 parts Polyol IV at 70° C. with two hours agitation.

Isocyanate B:

An isocyanate-group-containing prepolymer with an isocyanate content of 23 weight percent, prepared similarly to isocyanate A, however, 39.3 parts Polyol V were used instead of Polyol IV.

Isocyanate C:

An isocyanate-group-containing prepolymer with an isocyanate content of 23.3 weight percent, prepared similarly to isocyanate A, however, using 18.7 parts Polyol VI instead of Polyol IV.

Isocyanate D:

An isocyanate-group-containing prepolymer having an isocyanate content of 23 weight percent, prepared similarly to isocyanate A, however, using 38.8 parts Polyol III instead of Polyol IV.

Isocyanate E:

A polyisocyanate mixture having an isocyanate content of 32.6 weight percent, comprising: 40 parts of a mixture of 45 weight percent diphenylmethanediisocyanates and 55 weight percent polyphenylenepolymethylene polyisocyanates (polymeric MDI), 45 parts 4,4'-diphenylmethane diisocyanate, and 15 parts 2,4'-diphenylmethane diisocyanate.

Isocyanate F:

An isocyanate-group-containing prepolymer with an isocyanate content of 23 weight percent, prepared by the reaction of 100 parts 4,4'-diphenylmethane diisocyanate and 25.2 parts of a polyoxypropylene glycol having a hydroxyl number of 250, at 60° C. for four hours.

EXAMPLES 1-3 AND COMPARATIVE EXAMPLE

Preparation of elastic, cellular polyurethanes using isocyanate-group-containing prepolymers based on polyether-polyester polyols.

A Component:

A mixture comprising 86.4 parts Polyol I, 4.0 parts Polyol II, 2.8 parts water, 0.35 parts triethylenediamine (33 weight percent solution in dipropylene glycol), 0.35 part bis(N,N'-dimethylamino) diethylether, 0.1 part silicon stabilizer B 4690 (vendor: Goldschmidt, Essen), and 6 parts trichlorofluoromethane.

B Component:

Mixture comprising 40 parts of a mixture of diphenylmethane diisocyanates and polyphenylene polymethylene polyisocyanates having an isocyanate content of 31 weight percent (polymeric MDI) and 60 parts isocyanate as identified in accordance with Table I.

The A and B Components were mixed intensively for eight seconds at an index of 100 at room temperature (23° C.); 800 g of the mixture was poured into an aluminum mold with internal dimensions of 40×40×10 cm at 50° C. The mold was closed and the reaction mixture was allowed to expand.

The isocyanates used and the mechanical properties as measured on the resulting polyurethane flexible foams at a density of 50 g/l are summarized in Table I.

TABLE I

| Examples<br>Isocyanate | | 1<br>A | 2<br>B | 3<br>C | Comp.<br>Example<br>D |
|---|---|---|---|---|---|
| Tensile strength<br>per DIN 53 571 | [k · Pa] | 110 | 100 | 120 | 80 |
| Elongation<br>per DIN 53 572 | [%] | 94 | 97 | 105 | 86 |

TABLE I-continued

| Examples<br>Isocyanate | | 1<br>A | 2<br>B | 3<br>C | Comp.<br>Example<br>D |
|---|---|---|---|---|---|
| Tear strength<br>per DIN 53 575 | [N/mm] | 0.41 | 0.42 | 0.57 | 0.38 |
| Compression<br>hardness<br>at 40% deflection<br>per DIN 53 577 | [k · Pa] | 6.0 | 5.5 | 5.9 | 4.8 |

EXAMPLES 4 AND 5 AND COMPARATIVE EXAMPLE

Preparation of elastic, cellular polyurethanes using polyether-polyester polyols in the A Component.

A Component:

Mixture comprising 100 parts polyol per Table II, 2.8 parts water, 0.2 part silicone stabilizer B 46 90 (vendor: Goldschmidt, Essen), 0.4 part bis(N,N-dimethylamino) diethylether, and 0.35 part triethylenediamine (33 weight percent solution in dipropylene glycol).

B Component: Isocyanate E.

The A and B Components were mixed intensively for eight seconds at an index of 105 at room temperature (23° C.); 800 g of the mixture was filled into an aluminum mold with internal dimensions of 40×40×10 cm at 50° C. The mold was closed and the reaction mixture was allowed to expand.

The isocyanates used and the mechanical properties measured on the resulting polyurethane flexible foams at a density of 50 g/l are summarized in Table II.

TABLE II

| Examples<br>Polyol | | 4<br>IV | 5<br>V | Comp.<br>Example<br>III |
|---|---|---|---|---|
| Tensile strength<br>per DIN 53 571 | [k · Pa] | 200 | 180 | 140 |
| Elongation<br>per DIN 53 572 | [%] | 122 | 133 | 115 |
| Tear strength<br>per DIN 53 575 | [N/mm] | 0.7 | 0.61 | 0.49 |
| Compression hardness<br>at 40% deflection<br>per DIN 53 577 | [k · Pa] | 7.9 | 5.8 | 4.5 |

EXAMPLE 6 AND COMPARATIVE EXAMPLE

Preparation of an Elastic, Dense Polyurethane

A Component:

Mixture comprising 100 parts of a polyol per Table III, 7 parts 1,4-butanediol, 0.7 part triethylenediamine (33 weight percent solution in dipropylene glycol), and 0.03 part dibutyl tin dilaurate.

B Component: Isocyanate F.

The A and B Components were mixed intensively at room temperature (23° C.) at an index of 104 and the mixture was placed in an aluminum mold preheated to 50° C. and whose interior dimensions were 200×200×4 mm. The reactable polyurethane mixture cured in the closed mold very quickly to form an elastomer.

The polyols which were used and the mechanical properties of the resulting polyurethane elastomer are listed in Table III.

TABLE III

| Example Polyol | | 6 IV | Comp. Example III |
|---|---|---|---|
| Tensile strength per DIN 53 571 | [k · Pa] | 3.21 | 2.27 |
| Elongation per DIN 53 572 | [%] | 140 | 80 |
| Tear strength per DIN 53 575 | [N/mm] | 8.9 | 6.0 |

The embodiments of the invention in which an exclusive privilege or property is claimed are defined as follows:

1. In a process for the preparation of cellular or non-cellular polyurethanes through the reaction of an organic polyisocyanate with a polyol component in the presence of suitable catalysts and, in some cases, chain extenders or cross-linking agents, blowing agents, and auxiliaries or additives; wherein the improvement comprises utilizing as said polyol component an isocyanate-reactive polyol containing from 30 percent to 100 percent by weight of di- to tetrafunctional polyether-polyester polyols having hydroxyl numbers from 10 to 200 prepared by the process of:
   (a) esterifying di- to tetrafunctional polyether polyols having hydroxyl numbers from 15 to 250 with carboxylic acid anhydrides to form carboxylic acid half esters, and
   (b) oxyalkylating of the carboxylic acid half esters with alkylene oxides in the presence of a catalyst selected from the group consisting of:
      (i) N-methylimidazole,
      (ii) triethylenediamine,
      (iii) triphenylphosphine,
      (iv) mixtures of two or more of (i), (ii), and (iii), and
      (v) a mixture of thiodialkylene glycol and at least one of (i), (ii), and (iii).

2. The process of claim 1, wherein the di- to tetafunctional polyether polyols are esterified in the presence of N-methylimidazole, triethylenediamine or mixtures thereof as catalysts.

3. The process of claim 1, wherein
   (a) the di- to tetrafunctional polyether polyols are esterified with carboxylic acid anhydrides in the presence of N-methylimidazole, triethylenediamine or mixtures thereof as catalysts, and
   (b) the oxyalkylation of the carboxylic acid half esters with alkylene oxides is in the presence of a catalyst selected from the group consisting of:
      (i) N-methylimidazole,
      (ii) triethylenediamine,
      (iii) triphenylphosphine,
      (iv) mixtures of two or more of (i), (ii), and (iii), and
      (v) a mixture of thiodialkylene glycol and at least one of (i), (ii), and (iii).

4. The process of claim 1 wherein the oxyalkylation of the carboxylic acid half esters is performed in the presence of a catalyst comprising N-methylimidazole, triethylenediamine, diphenylphosphine, or mixtures thereof.

5. The process of claim 1, wherein from 0.05 part by weight to 2.0 parts by weight N-methylimidazole, triethylenediamine, triphenylphosphine, mixtures thereof, or mixtures thereof with thiodialkylene glycol are used per 100 parts by weight of the polyether polyol and carboxylic acid anhydride reaction mixture.

6. The process of claim 1, wherein the polyether polyols contain a maximum of 30 percent by weight of ethylene oxide residues.

7. The process of claim 1, wherein aromatic carboxylic acid anhydrides are used for the preparation of the carboxylic acid half esters.

8. The process of claim 7 wherein said aromatic carboxylic acid anhydride is phthalic acid anhydride.

9. The process of claim 1, wherein one mole-equivalent of polyether polyol is esterified with from 0.25 to 1.05 mole-equivalent of carboxylic acid anhydride to prepare the carboxylic acid half ester.

10. The process of claim 1, wherein said alkylene oxide is selected from the group consisting of
    (a) ethylene oxide,
    (b) propylene oxide, and
    (c) mixtures thereof.

11. The process of claim 10 wherein a plurality of alkylene oxides are added sequentially.

12. The process of claim 1, wherein one mole-equivalent alkylene oxide is used per mole-equivalent of carboxylic acid group of the carboxylic acid half ester for the oxyalkylation.

* * * * *